(12) United States Patent
Bathen et al.

(10) Patent No.: US 11,030,681 B2
(45) Date of Patent: Jun. 8, 2021

(54) INTERMEDIATE BLOCKCHAIN SYSTEM FOR MANAGING TRANSACTIONS

(71) Applicant: International Business Machines Corporation, Armonk, NY (US)

(72) Inventors: Luis Angel D. Bathen, Placentia, CA (US); Pawan R. Chowdhary, San Jose, CA (US); Andres Garagiola, Buenos Aires (AR); Shun Jiang, San Jose, CA (US); Diego A. Masini, Buenos Aires (AR); Guangjie Ren, Belmont, CA (US); Dulce B. Ponceleon, Palo Alto, CA (US); Chung-hao Tan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 15/656,565

(22) Filed: Jul. 21, 2017

(65) Prior Publication Data
US 2019/0026821 A1    Jan. 24, 2019

(51) Int. Cl.
*G06Q 40/00*    (2012.01)
(52) U.S. Cl.
CPC ................................... *G06Q 40/00* (2013.01)
(58) Field of Classification Search
CPC .... G06Q 40/00; G06Q 20/3829; G06Q 40/06; G06Q 2220/00; G06Q 20/3678; G06Q 20/02; G06Q 20/36; G06Q 20/3674; G06Q 20/3285; G06Q 20/401; G06Q 30/018; G06Q 30/0641; G06Q 40/04; G06Q 50/188; G06Q 20/06; G06Q 20/065; G06Q 20/381; G06Q 20/4014; G06Q 40/08; H04L 2209/56; H04L 9/3247; H04L 2209/38; H04L 63/0428; H04L 63/105; H04L 67/104; H04L 67/26; H04L 9/0637; H04L 9/0861; H04L 9/14; H04L 9/30; H04L 9/3236; H04L 9/3268; H04L 9/3297;
(Continued)

(56) References Cited

U.S. PATENT DOCUMENTS 10,171,245 B2 *   1/2019  Wilkins .................. G06F 21/64
2002/0161681 A1 * 10/2002  Richman ................ G06Q 20/10
                                                            705/36 R
(Continued)

OTHER PUBLICATIONS

Bitcoin Developer Guide, Escrow and Arbitration, p. 23. https://bitcoin.org/en/developer-guide#escrow-and-arbitration.
(Continued)

*Primary Examiner* — Slade E Smith

(57) ABSTRACT

An example operation may include one or more of identifying a first conferred asset exchange request from a first user account and a second conferred asset exchange request from a second user account which are capable of being used to settle each other, requesting an intermediary blockchain to perform a conferred asset settlement transaction for the first and second conferred asset exchange requests, determining that first conferred assets of the first user account and second conferred assets of the second user account have been transferred to temporary intermediary trading addresses, respectively, and releasing the first conferred assets to the second user account and the second loyalty assets to the first user account, in response to the determining.

17 Claims, 6 Drawing Sheets

(58) Field of Classification Search
CPC ........ H04L 63/04; H04L 63/06; H04L 67/20; H04L 67/42; G06F 12/1408
USPC .......................................................... 705/39
See application file for complete search history.

(56) References Cited

U.S. PATENT DOCUMENTS

| | | | | |
|---|---|---|---|---|
| 2002/0194099 A1* | 12/2002 | Weiss | ...................... | G06Q 40/08 705/36 R |
| 2009/0119209 A1* | 5/2009 | Sorensen | .............. | G06Q 20/102 705/40 |
| 2010/0268614 A1* | 10/2010 | Pratt | ....................... | G06Q 20/20 705/16 |
| 2012/0197748 A1* | 8/2012 | Vorse | ...................... | G06Q 30/08 705/26.3 |
| 2014/0279688 A1* | 9/2014 | Ginsberg | ............... | G06Q 40/06 705/36 R |
| 2015/0206106 A1* | 7/2015 | Yago | .................. | G06Q 20/0655 705/68 |
| 2015/0248735 A1* | 9/2015 | Stapp | .................... | G06Q 50/188 705/80 |
| 2015/0332256 A1* | 11/2015 | Minor | ................... | G06Q 20/381 705/69 |
| 2016/0092988 A1* | 3/2016 | Letourneau | .......... | G06Q 20/363 705/66 |
| 2016/0140653 A1* | 5/2016 | McKenzie | ......... | G06Q 20/3678 705/69 |
| 2016/0210626 A1* | 7/2016 | Ortiz | .................... | G06Q 20/023 |
| 2016/0292672 A1* | 10/2016 | Fay | ..................... | G06Q 20/3829 |
| 2016/0292680 A1* | 10/2016 | Wilson, Jr. | ............. | G06Q 20/40 |
| 2016/0335629 A1* | 11/2016 | Scott | ...................... | G06Q 40/06 |
| 2016/0342977 A1* | 11/2016 | Lam | ................... | G06Q 20/0658 |
| 2016/0358186 A1* | 12/2016 | Radocchia | ................ | H04L 9/14 |
| 2016/0371687 A1* | 12/2016 | Imlay | ................. | G06Q 30/0223 |
| 2017/0017958 A1* | 1/2017 | Scott | ...................... | G06Q 20/36 |
| 2017/0154331 A1* | 6/2017 | Voorhees | ................ | H04L 67/42 |
| 2017/0230189 A1* | 8/2017 | Toll | ........................ | H04L 9/3247 |
| 2017/0232300 A1* | 8/2017 | Tran | ........................ | H04L 67/10 434/247 |
| 2017/0255912 A1* | 9/2017 | Casebolt | ............ | G06Q 20/3827 |
| 2017/0352012 A1* | 12/2017 | Hearn | .................... | G06Q 50/18 |
| 2018/0330342 A1* | 11/2018 | Prakash | ............. | G06Q 20/4014 |
| 2019/0305966 A1* | 10/2019 | Qiu | ........................... | H04L 9/30 |
| 2020/0090188 A1* | 3/2020 | Wince | .................. | H04L 9/3239 |

OTHER PUBLICATIONS

Anonymous, MultiChain, Nov. 15, 2015, http://www.multichain.com/qa/457/multichain-support-atomic-asset-exchange-multi-blockchains.

Atomic cross-chain trading, Bitcoinwiki, https://en.bitcoin.it/wiki/Atomic_cross-chain_trading, Sep. 17, 2016.

Adam Back et al., Enabling Blockchain Innovations with Pegged Sidechains, Oct. 22, 2014.

* cited by examiner

INTERMEDIATE BLOCKCHAIN SYSTEM FOR MANAGING TRANSACTIONS

TECHNICAL FIELD

This application generally relates to blockchain transactions, and more particular, to an intermediate blockchain system for managing conferred asset transactions.

BACKGROUND

A blockchain may be used as a public ledger to store information such as digital assets and the like. Since any individual or entity can provide information to a blockchain, this information should be reviewed and confirmed. This operation is known as consensus. There are two types of consensus centralized and decentralized. Centralized consensus includes one central database that is used to rule transaction validity. A decentralized consensus transfers authority and trust to a decentralized network and enables its nodes to continuously and sequentially record their transactions on a public "block", creating a unique "chain" referred to as a blockchain. Cryptography, via hash codes, is used with a blockchain to secure an authentication of a transaction source and removes the need for a central intermediary.

A loyalty program (also referred to as a rewards program) is typically offered by merchants and other organizations to consumers who make frequent and consistent purchases thereby affording these consumers a special status with the merchant. For example, a loyalty program may give a consumer advanced access to new products, special sales coupons, free merchandise, and the like. Consumers typically register their personal information with the company and are given a unique identifier, such as a numerical ID or membership card, and use that identifier when making a purchase.

When consumers have different loyalty points from different loyalty programs (e.g., different merchants), they may want to exchange different types of loyalty program points with others. Enabling the exchange of different types of loyalty points, however, is a difficult task because most merchants do not recognize loyalty points awarded by other merchants. Accordingly, what is needed is a convenient system that can facilitate the exchange of loyalty points thereby encouraging loyalty program members to be more active in loyalty program events and to grow the ecosystem of loyalty programs.

SUMMARY

In one example embodiment, provided is a method that includes one or more of identifying a first conferred asset exchange request from a first user account and a second conferred asset exchange request from a second user account which are capable of being used to settle each other, requesting an intermediary blockchain to perform an asset settlement transaction for the first and second conferred asset exchange requests, determining that first conferred assets of the first user account and second conferred assets of the second loyalty account have been transferred to temporary intermediary trading addresses, respectively, and releasing the first conferred assets to the second user account and the second conferred assets to the first user account, in response to the determining.

In another example embodiment, provided is a system that includes a processor configured to perform one or more of identify a first conferred asset exchange request from a first user account and a second conferred asset exchange request from a second user account which are capable of being used to settle each other, and a transmitter configured to transmit a request to an intermediary blockchain requesting the intermediary blockchain to perform a conferred asset settlement transaction for the first and second conferred asset exchange requests, wherein the processor is further configured to determine that first conferred assets of the first user account and second conferred assets of the second user account have been transferred to temporary intermediary trading addresses, respectively, and release the first conferred assets to the second user account and the second conferred assets to the first user account, in response to the determining.

Another example embodiment provides a non-transitory computer readable storage medium configured to store instructions that when executed cause a processor to perform one or more of identifying a first conferred asset exchange request from a first user account and a second conferred asset exchange request from a second user account which are capable of being used to settle each other, requesting an intermediary blockchain to perform a conferred asset settlement transaction for the first and second conferred asset exchange requests, determining that first conferred assets of the first user account and second conferred assets of the second user account have been transferred to temporary intermediary trading addresses, respectively, and releasing the first conferred assets to the second user account and the second conferred assets to the first user account, in response to the determining.

BRIEF DESCRIPTION OF THE DRAWINGS

For a proper understanding of the example embodiments provided herein, reference should be made to the accompanying figures. It should be appreciated that the figures depict only some embodiments of the invention and are not limiting of the scope of the invention.

DETAILED DESCRIPTION

Figure 1:
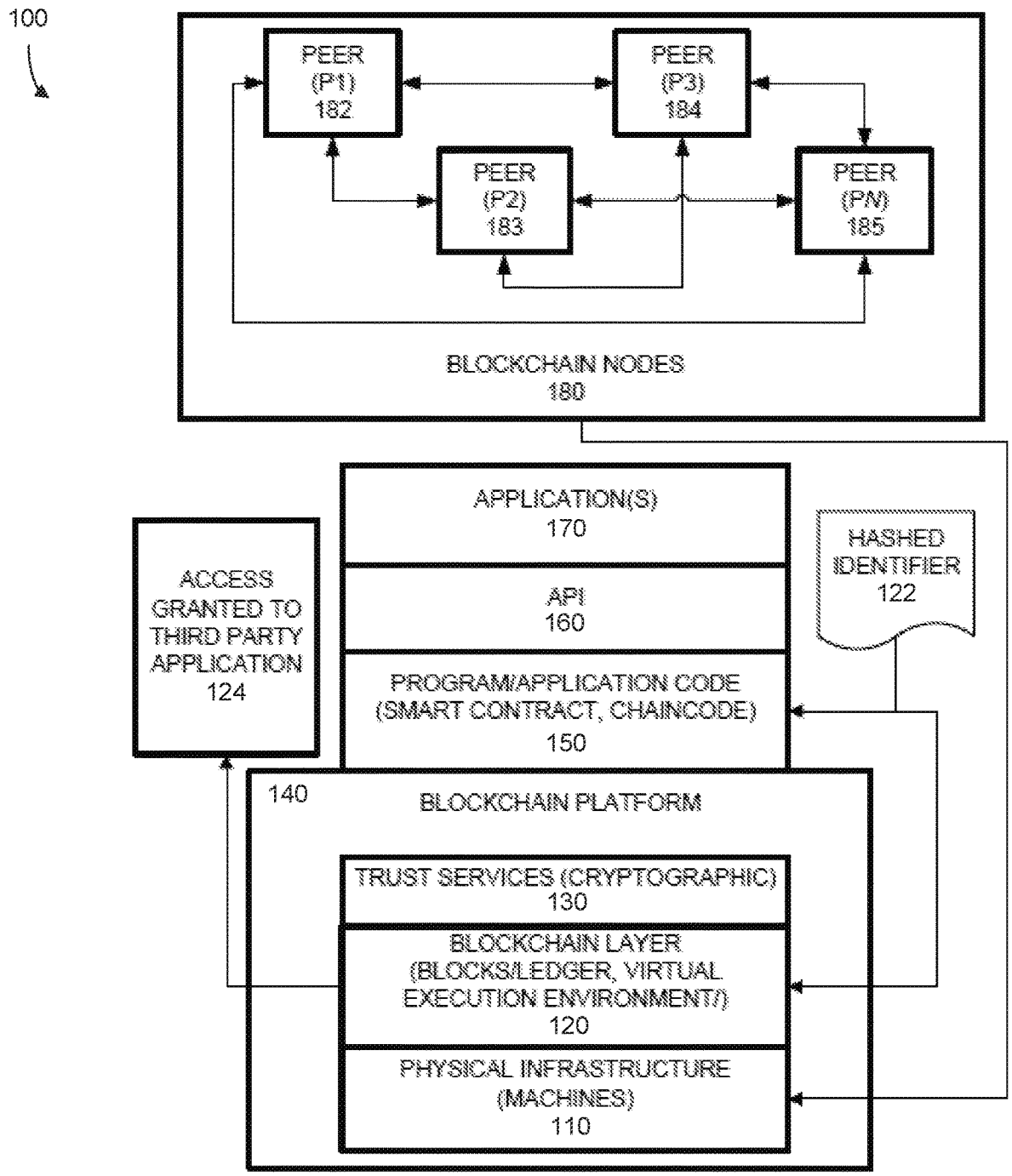
FIG. 1 is a diagram illustrating a blockchain system database configuration, according to example embodiments.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to blockchain transactions, and in another embodiment relates to managing exchange transactions related to conferred assets using an intermediary blockchain.

Embodiments herein are directed to an intermediary blockchain system and method for managing the exchange of conferred assets (e.g., loyalty points, rewards, etc.) from different user accounts which may be managed by different blockchains. The conferred assets described herein may be conferred, designated, or otherwise provided to a user account from an entity associated with the user account such as a merchant, a digital wallet, a financial institution, or another entity. Conferred assets may accrue overtime as the user account makes purchases and uses their account/wallet. An intermediate or intermediary blockchain and a broker agent software program may be used to facilitate the exchange of loyalty assets from different users associated with different blockchains corresponding to the loyalty assets. The intermediary blockchain (or nodes thereof) may receive requests from different exchange participants and the broker agent may match exchange requests that satisfy conditions of other requests to be settled as a group. The intermediary blockchain may facilitate the exchange process based on a publicly accessible smart contract script and immutable transaction characteristics enforced by the intermediary blockchain.

The broker agent may use the smart contract on the intermediary blockchain to create an exchange transaction between two or more participants which includes the information about the exchange activity, for example, the participants' receiving addresses, type of points/assets being exchanged and amounts thereof, temporary trading addresses, and the like. According to various aspects, the exchange transaction can be processed on the intermediary blockchain and therefore can be trusted. The smart contract may belong to a DAO (Decentralized Autonomous Organization) account which has signature capability on the intermediary blockchain. Furthermore, the broker agent can be linked to the DAO account which enables the broker agent to make profit from the exchange processes.

A smart contract (e.g., computerized transaction protocol) associated with the intermediary blockchain may be used to process the exchange transactions to facilitate the exchange process by verifying the conditions of requests can be satisfied, and providing an intermediary trading address (which the smart contract in the DAO have the ownership) for participants to transfer their assets to it temporarily. In addition, once all participants have transferred the corresponding assets required to the intermediary trading address on each asset blockchain, the smart contract can release all the assets on the temporary intermediary trading addresses to corresponding receivers on asset blockchains.

FIG. 1 illustrates a blockchain system database configuration, according to example embodiments. Referring to FIG. 1, a blockchain system 100 may include certain common blockchain elements, for example, a group 180 of assigned peer blockchain nodes 182-185 which participate in blockchain transaction addition and validation process (consensus). Any of the blockchain peer nodes 180 may initiate new transactions such as loyalty asset exchange transactions and seek to write to a blockchain immutable ledger 120, a copy of which is stored on the underpinning physical infrastructure 110. In this configuration, the customized blockchain configuration may include one or applications 170 which are linked to application programming interfaces (APIs) 160 to access and execute stored program/application code (e.g., chain code and/or smart contracts) 150, which are created according to the customized configuration sought by the participants and can maintain their own state, control its own assets, and receive external information. This code can be deployed as a transaction and installed, via appending to the distributed ledger, on all blockchain peer nodes.

The blockchain base or platform 140 may include various layers of blockchain data, services (e.g., cryptographic trust services, virtual execution environment), and underpinning physical computer infrastructure necessary to receive and store new transactions and provide access to auditors which are seeking to access data entries. The blockchain layer 120 may expose an interface that provides access to the virtual execution environment necessary to process the program code and engage the physical infrastructure 110. Cryptographic trust services 130 may be used to verify transactions such as asset exchange transactions and keep information private.

The blockchain configuration of FIG. 1 may process and execute program/application code 150 by way of one or more interfaces exposed, and services provided, by blockchain platform 140. The code may control blockchain assets. For example, the code can store and transfer data, and may be executed by the blockchain in the form of a smart contract and associated chain code with conditions or other code elements subject to its execution. The smart contracts 150 may be created to execute reminders, updates, and/or other notifications subject to the changes, updates, etc. The smart contracts can themselves be used to identify rules associated with authorization and access requirements and usage. For example, hashed identifier information 122 received from a user device may be processed by one or more processing entities (virtual machines) included in the blockchain layer 120. The result may include access being granted 124 to a third party application from the blockchain computing environment (VM). In this example, the previously known user identifiers or data template information may be stored in the blockchain platform 140. The physical machines 110 may be accessed to retrieve the user device template and the information can be used to match against incoming user identifiers for verification purposes.

Within chaincode, a smart contract may be created via a high-level application and programming language, then converted to a string that is written to a block in the blockchain. The smart contract may be invoked by a user device submitted operation or as further described herein, by a broker agent. The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. In operation, a user device associated with a user account submits a service request and that service request triggers smart contract authentication routine via chaincode. The user may use device/smartphone functions to create an identifier (e.g., photo of face, fingerprint, etc.). The details of this identifier may be extracted via a feature extractor and may be mapped to data in data template, which is then transformed to a hash. The hash is then transmitted to the blockchain and/or smart contract. The chaincode receives the hash and retrieves from the blockchain a hash associated with the data template created by use of a previously stored client identifier and feature extractor. If the hashes of the hash identifier and the hash created from the stored identifier template data match, then the chaincode sends an authorization key to the requested service. The chaincode may write to the blockchain data including the following and associated cryptographic details: time stamp for the authorization, identification of the user, identification of the identifier types utilized and matched, identification of the service authorized, identification of the chaincode invoked, loyalty asset information (e.g., type and amount requested), and the like.

Figure 2:
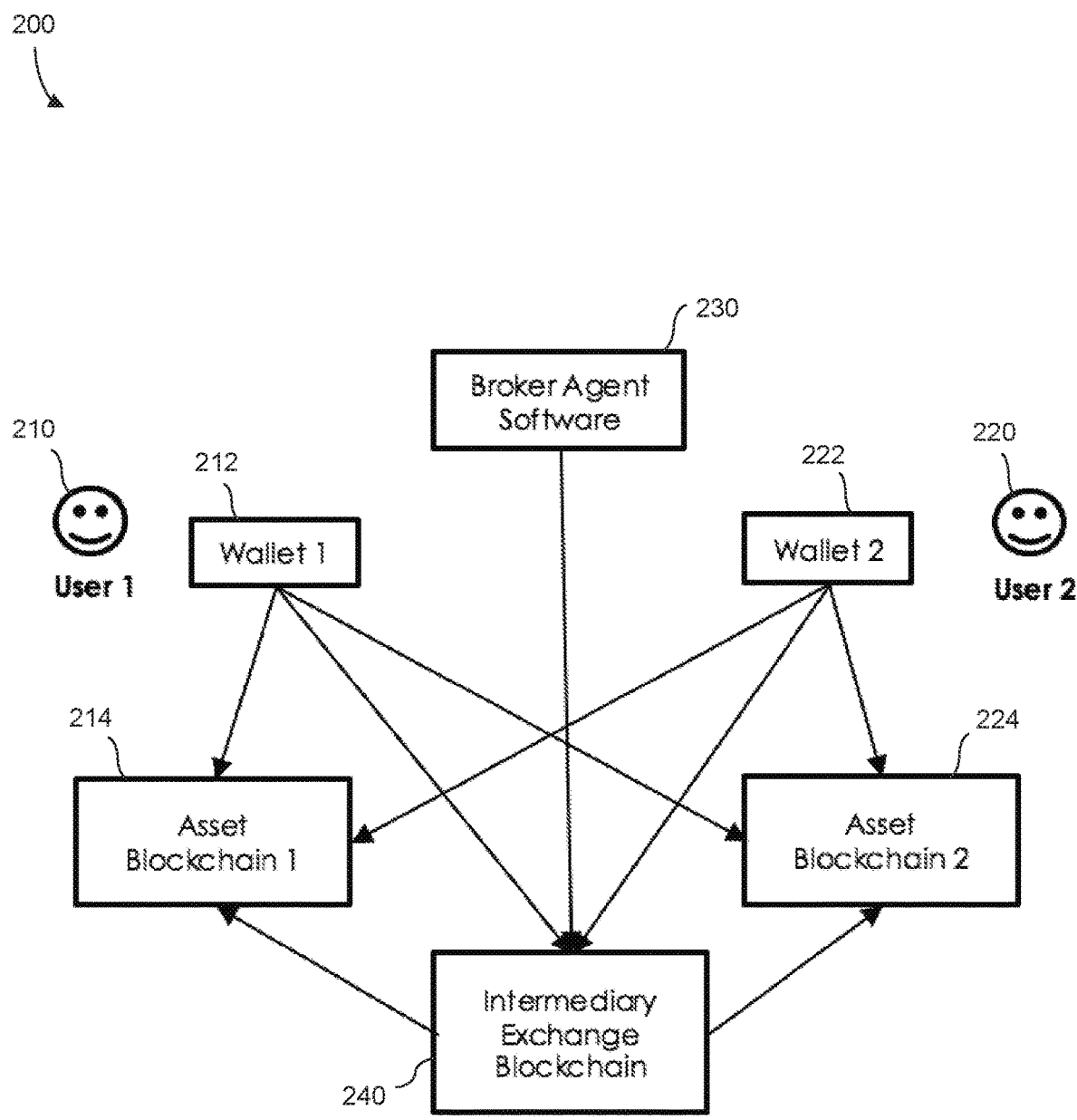
FIG. 2 is a diagram illustrating a blockchain system configuration for exchanging conferred assets, according to example embodiments.

FIG. 2 illustrates a blockchain system configuration for exchanging conferred assets, according to example embodiments. Referring to FIG. 2, blockchain system 200 includes a first user 210 and a second user 220 performing an exchange of conferred assets. In this example, the first user 210 has a user account represented by wallet 212 which owns loyalty assets stored on an asset blockchain 214. Similarly, the second user 220 has a user account represented by wallet 222 which owns loyalty assets stored on asset blockchain 224. Here, the asset blockchains 214 and 224 may be different loyalty assets (e.g., flight, hotel, credit card, grocery, clothing, etc.) which are not compatible with one another. According to various embodiments, the blockchain system 200 further includes an intermediary blockchain 240 and a broker agent 230 for managing and facilitating a transfer of loyalty assets between the first and second users 210 and 220. Here, the loyalty assets may correspond to points, miles, or any other loyalty reward. Although one broker agent 230 is shown, the system may include multiple broker agents with compete with each other within the blockchain system 200.

In the system 200 of FIG. 2, different loyalty program points are managed by different asset blockchain instances (from security, management and scalability considerations). In this example, the broker agent 230 may detect conferred asset (e.g., loyalty asset) exchange requests from different requesters and match a set of (i.e., two or more) requests which satisfy the requirement of each (could be more than two). The broker agent 230 may not necessarily be trusted and there will be no asset safety problems even if the broker is compromised. A Decentralized Autonomous Organization (DAO) account is supported on the intermediary blockchain 240 to establish trust by using an exchange smart contract including a script that is publicly available as a historical transaction and secured by the intermediary blockchain 240.

The intermediary blockchain 240 includes a smart contract belonging to the DAO which enables the exchange of loyalty assets from user accounts on different asset blockchains in a secured and instantaneous approach. In this example, there are no dependencies required among asset blockchains, and the intermediary blockchain 240, also referred to as the exchange blockchain, can support different types of loyalty points asset blockchain implementations using corresponding customized smart contracts. In addition, the whole exchange business network using this method is scalable by creating any number of intermediary exchange blockchains 240. Furthermore, the DAO account can automatically process and make income from exchange transactions by matching the profitable ones in the transaction.

In contrast to a simple escrow service, the intermediary exchange blockchain 240 provides an immutable history of exchange transaction history between transactions such as loyalty asset transactions, through which broker agents 230 can establish and accumulate trusts between them and their users based on the public accessible past exchange transactions. It also provides the marketplace where broker agents can compete with each other. For example, a broker agent 230 can separate from other agents by improving the success ratio and time of exchange transactions which relies on their own operation financial pool, and more advanced analytic and predication capability, since this information is visible to public on the intermediary exchange blockchain.

There are multiple types of transactions stored in a block of the intermediary exchange blockchain 240 to support the asset exchange across separate asset blockchains. One type of transaction is an exchange request transaction which includes the information from users to request for loyalty asset exchange. Another type of transaction is an exchange settlement transaction which includes the information about the set of exchange request transactions and extra information from broker for exchange settlement. All asset ownership transfers are done on each asset blockchain, and no assets are transferred between asset blockchains and the intermediary exchange blockchain 240.

According to various aspects, the intermediary exchange blockchain 240 may facilitate a loyalty asset exchange process which can be trusted by use of a publicly readable smart contract script and immutable transaction characteristics enforced by the intermediary exchange blockchain 240. The broker agent 230 may also use the smart contract on the intermediary exchange blockchain 240 to create or request an exchange transaction which includes information about the exchange activity such as participant's receiving addresses, type of loyalty assets to be exchanged, amounts of loyalty assets, and the like. Because the exchange transaction is processed on the intermediary exchange blockchain 240, the exchange can be trusted.

The smart contract on the intermediary exchange blockchain 240 can process the exchange transaction by verifying conditions of the exchange request can be satisfied (i.e., loyalty assets and amounts) based on requests from the broker agent 230. The smart contract and/or the broker agent 230 can also provide an intermediary trading address to participants to transfer their assets temporarily. Furthermore, once the loyalty assets are transferred by all participants to the temporary trading addresses, the broker agent 230 may control the intermediary blockchain to release the loyalty assets to the receiving parties.

In this example, a transaction may include the first user 210 exchanges loyalty assets with the second user 220. Here, the first user 210 may request to exchange loyalty asset X in X1 units for loyalty asset Y in Y1 units, and the second user 220 may request to exchange loyalty asset Y in Y2 units for loyalty asset X in X2 units. In this example, on blockchain 214, the first user 210 may own enough unspent transaction outputs of asset X which are greater than or equal to X1 units, and on blockchain 224, the second user 220 may own enough unspent transaction outputs of asset Y which are greater than or equal to Y2 units.

The atomic process described herein can handle the transaction between the first user 210 and the second user 220 instantaneously and provide a result (i.e., success or failed). When the transaction fails, the first user 210 retains ownership of asset X in X1 units and the second user 220 retains ownership of asset Y in Y2 units. However, when successful, the first user 210 will receive ownership of asset Y in Y2 units on asset blockchain 224 and the second user 220 will receive ownership of asset X in X1 units on asset blockchain 214. FIG. 2 illustrates an example of this process being performed.

In a first step, the first user 210 submits an exchange request, which requests Asset Y in Y2 units in exchange for Asset X in X1 units, to a node of intermediary exchange blockchain 240 which records the request in one exchange request transaction on an intermediary exchange blockchain ledger. Other users submit other exchange requests which requests for any type and units of loyalty assets in exchange for another type of loyalty asset(s) and these requests are also recorded as exchange request transaction on the same ledger. For example, an exchange request transaction stored on the intermediary exchange blockchain ledger may include at least the following information (take the first user 210 as example): a) request loyalty asset type Y and units Y2, b) proof of ownership of loyalty asset X unspent output transaction on asset ledger X and the units promised for exchange. The proof of ownership can be verified by anyone outside the asset ledger X. Also, c) a wallet address to receive expected exchange on asset ledger Y.

In a second step, broker agent 230 (and possibly other agents monitoring the exchange requests on intermediary exchange blockchain 240) tries to find a set of requests which can be settled as a group. For example, in one ideal case the broker agent 230 might find another request from the second user 220 which requests Asset X in X1 units in exchange for Asset Y in Y2 units. In real life, however, this might not happen very often. In this later case, broker agent 230 might find a case which involves a group of more than two requests which can be settled to satisfy the condition of the requests in the group. For example, User 1 requests Asset Y in Y2 units in exchange for Asset X in X1 units, User 2 requests for Asset Z in Z2 units in exchange for Asset Y in Y1 units, and User 3 requests for Asset X in X2 units in exchange for Asset Z in Z1 units. When $X1>X2$ and $Y1>Y2$ and $Z1>Z2$ then the three requests can be settled as a group, and the broker agent may make profit which is $(X1-X2)+(Y1-Y2)+(Z1-Z2)$. Furthermore, as long as broker agent is making profit from the group, even some of the conditions does not satisfy, e.g. when $X1<X2$, the agent can even use its own financial account to put in X3 into this exchange process to make $X2=X1+X3$, and still make profit from this exchange process as long as $(X1-X2-X3)+(Y1-Y2)+(Z1-Z2)>0$. An example of a broker agent pulling assets out of their own account to settle a transaction is shown and described with respect to FIG. 6.

A more advanced agent can even tolerate the loss of profit in some exchange settlement transactions in order to, for example, accumulate credits by increase the exchange transaction volume for future profits (sort of investment). In a third step, after broker agent 230 has identified the group of requests (including the self-investment request if necessary) which including the first user's 210 request, then broker agent 230 may request for settlement to a node of intermediary exchange blockchain 240, and that request will be recorded in an exchange settlement transaction. The exchange settlement transaction may include the following information: a) broker identity information and the proof of identity, b) the list of exchange request transaction references to indicate what are the exchange requests are included, c) a list of temporary intermediary trading addresses, owned by broker 230, one for each user on corresponding asset ledger, d) the investments and proof of ownership from broker 230 in order to settle the requests, and e) the receiving address from broker 230 to receive the profit from this settlement.

In a fourth step, nodes of the intermediary exchange blockchain 240 may monitor the exchange settlement transactions and notify the users to transfer the assets from current addresses to the temporary intermediary trading addresses where the broker agent 230 will have full control of the assets. This means, users have to trust the broker agent 230 to be honest to settle the exchange requests. The trust can be established on the credits from the transactions brokers have done in the past.

In a fifth step, the broker agent 230 may monitor the temporary intermediary trading address on each asset ledger involved in exchange settlement transactions on the intermediary exchange blockchain 240 which they submitted, and sign and release the loyalty assets from temporary intermediary trading address to the users receiving wallet address in response to all assets from users in the transaction having been received. Here, the broker agent 230 may request the intermediary exchange blockchain 240 to release loyalty asset Y in Y2 units to the first user 210.

If the temporary intermediary trading addresses do not receive expected assets in a configurable time threshold, broker agent 230 can choose to give up the exchange transaction and return all assets to the original wallet addresses. But a more advanced broker agent 230 can tolerate some risks based on analytic and predication, and release corresponding assets to users who have transferred their assets even not all the users transferred their assets at that moment by using its own assets to compensate missing part of the exchange transaction. Later on, if remaining users transferred their assets, broker agent 230 can fulfill the obligation of the exchange contract. If remaining users decide to not transfer the asset to temporary intermediary trading addresses at all, broker agent 230 will not necessarily loss value of the assets it controlled overall, but might need to balance the pool of assets it has in order to facilitate the other exchange transactions. In this case, even when some of the users in one exchange transaction give up in the middle, the exchange transaction still has chance to allow the other users in the same transaction get what they are asking for which can improve the success ratio of the exchange transactions.

The blockchain system 200 provides a number of advantages including the ability to manage different types of loyalty assets on separate asset blockchain instances which is a very attractive architecture for the scalability of the whole ecosystem. In this case, different asset blockchains managing assets stored thereon might have different implementations, so only a small set of common functions may be used for the exchange process. Furthermore, no dependencies between asset blockchains may exist, e.g. using any specialized rules in contract to verify the status on another asset blockchain. The blockchain system 200 enables an atomic exchange process to facilitate the exchange of loyalty points managed by different asset blockchains where the different asset blockchains do not have dependencies. The atomic exchange process is symmetric to exchange participants thereby making the solution scalable to situations with more than two participants. Furthermore, the broker agent 230 used to facilitate the exchange process is not necessarily to be trusted since it will not be able to take over the ownership of any assets even it is compromised. In addition, as many intermediary exchange blockchains 240 can be created which enables the competition of them on market and also makes the whole exchange ecosystem scalable without a single failure point.

Figure 3:
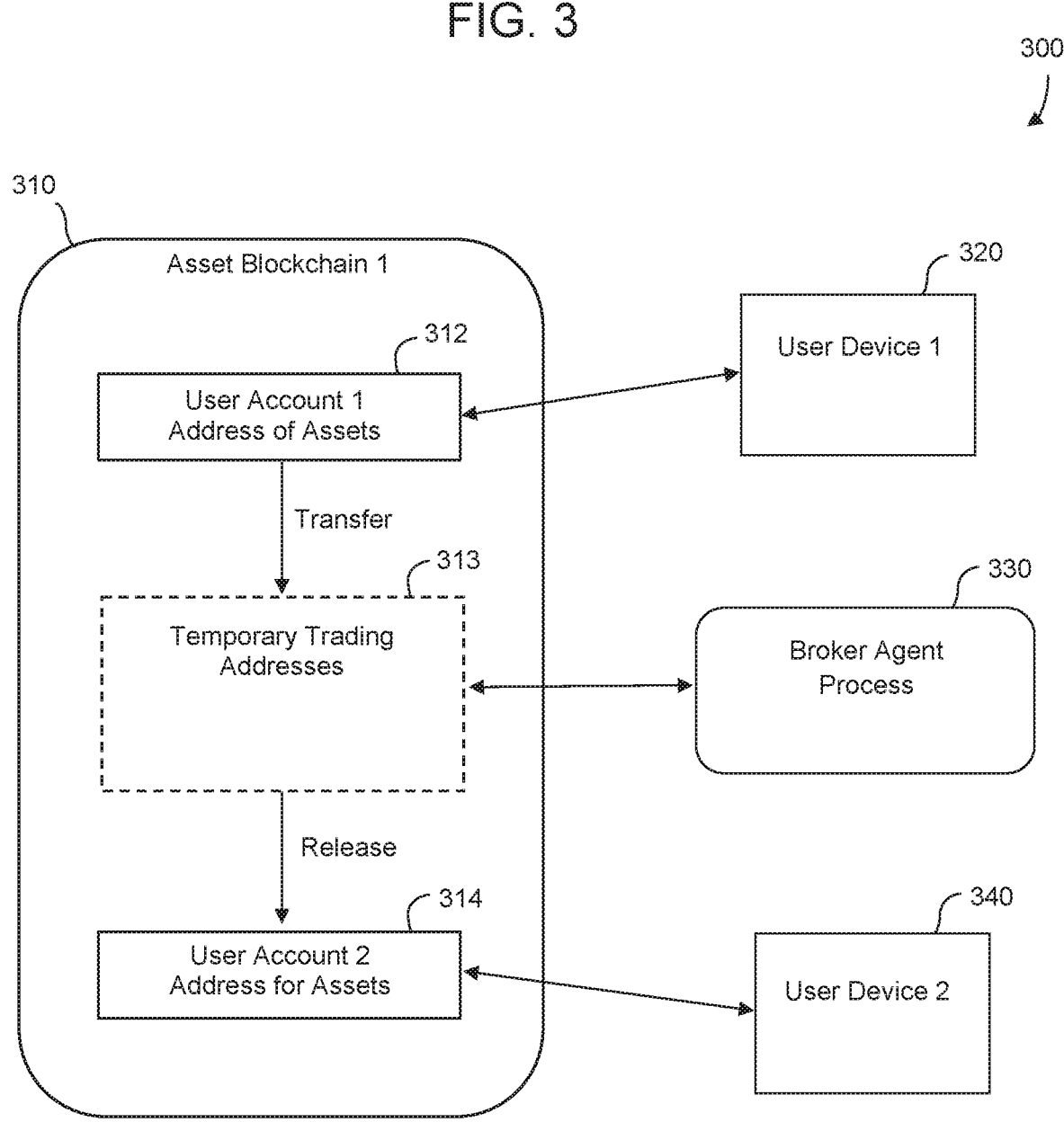
FIG. 3 is a diagram illustrating temporary trading addresses of an asset blockchain, according to example embodiments.

FIG. 3 illustrates an example of temporary trading addresses being used to facilitate transfer of conferred assets between user accounts 300, in accordance with example embodiments. Referring to FIG. 3, asset blockchain 310 which may correspond to either asset blockchain 214 or asset blockchain 224 in FIG. 2, is used to store loyalty assets owned by various user accounts. In this example, the asset blockchain 310 may be dedicated for a particular merchant, company, organization, user, and/or the like. In FIG. 3, user device 320 controls blockchain address 312 which is used to store loyalty assets owned by a first user account corresponding to a user of user device 320. Similarly, user device 340 controls blockchain address 314 which is used to store loyalty assets owned by a second user account corresponding to a user of user device 340.

According to various embodiments, the asset blockchain 310 also includes one or more temporary trading addresses 313 which may be used by any of the user devices to transfer assets during an exchange process. In this example, the temporary trading addresses 313 are controlled by the broker agent 330 and are not capable of being controlled by any of the user accounts or user devices 320 and 340. Accordingly, once a user account has transferred assets to a temporary trading address 313, the transferred assets may be under sole control of the broker agent 330. As described herein, a temporary intermediary trading address may be a wallet address on an asset blockchain which is fully controlled by a broker agent and which may receive assets from users which are owned by the user and subject to an exchange or requested for exchange. The user may transfer their assets to a temporary intermediary trading address by changing the ownership of the assets from them to broker agent.

In the example of FIG. 3, the first user account transfers conferred assets to the second user account, via a temporary trading address 313. Here, the broker agent 330 may request the first user device 320 to transfer conferred assets owned by the first user account to the temporary trading address 313. In response, the first user device 320 controls asset blockchain 310 to transfer assets from blockchain address 312 which is controlled by the first user device 320 to temporary trading address 313 controlled by the broker agent 330. Accordingly, the first user relinquishes control of the loyalty assets when they are transferred to the temporary trading address 313. In this example, it is assumed that the second user account also transfers loyalty assets requested by the first user account to a temporary trading address on a different asset blockchain corresponding to the different loyalty assets. The broker agent 330 can detect that both the first user account and the second user account have satisfied their transfer obligations, and release the loyalty assets from the first user account stored in the temporary trading address 313 to the second user account, and in particular, to the blockchain address 314 controlled by the second user account. Although not shown, the broker agent 330 can also control loyalty assets from the other asset blockchain to be released to the first user account.

Figure 4:
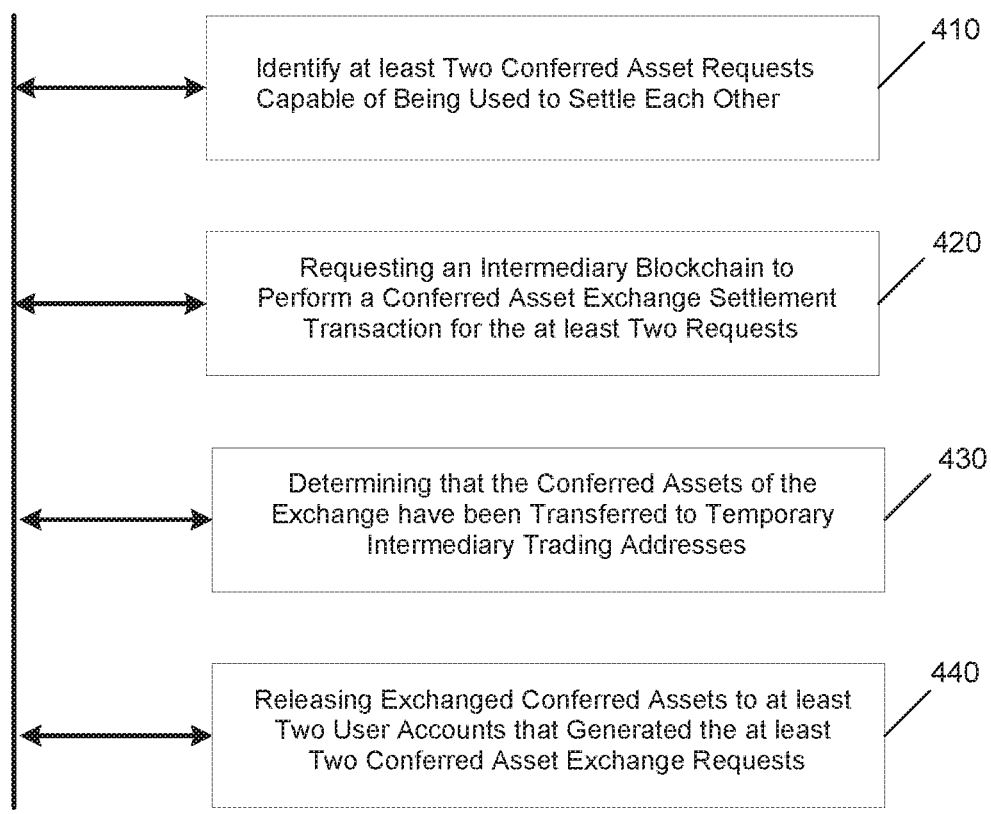
FIG. 4 is a diagram illustrating a method of managing a conferred asset blockchain exchange, according to example embodiments.

FIG. 4 illustrates a method 400 of managing a conferred asset blockchain exchange, according to example embodiments. For example, the method 400 may be performed by a broker agent computing system such as a server, a cloud computing platform, a workstation, a user device, and the like. Referring to FIG. 4, in 410 the method includes identifying a plurality of conferred asset exchange requests that can be processed to settle each other. For example, the identifying may include identify at least two (e.g., first and a second conferred asset exchange requests) from a first and second user account, respectively, which can be used to satisfy conditions of the other. As another example, more than two loyalty asset exchange requests may be used to settle each other, however, for purposes of example two loyalty exchange requests are described. In this example, first loyalty assets of the first user account may be stored on a first asset blockchain and second loyalty assets of the second user account may be stored on a second asset blockchain. In some embodiments, each of the first and second loyalty asset exchange requests may include: a requested asset type and a requested amount of the requested asset type, proof of ownership of another asset being exchanged for the requested asset type, and an address (e.g., temporary and permanent) to receive the requested asset type.

In 420, the method includes requesting, by the broker agent, an intermediary blockchain to perform a conferred asset settlement transaction for the first and second loyalty asset exchange requests. The first and second loyalty asset requests may be associated with requesting loyalty assets from first and second asset blockchains. Here, the intermediary blockchain may facilitate transfer of loyalty assets between the first and second asset blockchains. In some embodiments, the broker agent may monitor a loyalty asset exchange request ledger of the intermediary blockchain to identify at least two loyalty asset exchange requests which can be settled together as a group.

A first user account may include loyalty assets owned by the first user and which are stored on the first asset blockchain. Meanwhile, a second user account may include loyalty assets owned by the second user and which are stored on the second asset blockchain. In this case, the first user may request loyalty assets owned by the second user, and vice versa. The intermediary blockchain may store a transaction identifying the first user account, the second user account, the asset types and amounts being exchanged, addresses for the temporary transfer of the assets, addresses for the permanent transfer of the assets, and the like. As another example, the broker agent may request the intermediary blockchain to perform a loyalty settlement transaction for more than two asset exchange requests corresponding to more than two user accounts.

The intermediary blockchain can instruct or otherwise request the first and second users to transfer the loyalty assets to be exchanged to respective temporary trading addresses of each asset blockchain on which the loyalty assets are stored. Here, the temporary trading addresses on both asset blockchains are under control of the broker agent, and not the users. In 430, the method further includes determining that first conferred assets of the first user account and second loyalty assets of the second loyalty account have been transferred to temporary intermediary trading addresses, respectively. In this example, the first loyalty assets may be transferred to a temporary intermediary trading address of the first asset blockchain, and the second loyalty assets may be transferred to a temporary trading address of the second asset blockchain. In 440, the method further includes controlling the intermediary blockchain to release the first conferred assets to the second user account and the second conferred assets to the first user account, in response to the determining.

Figure 5:
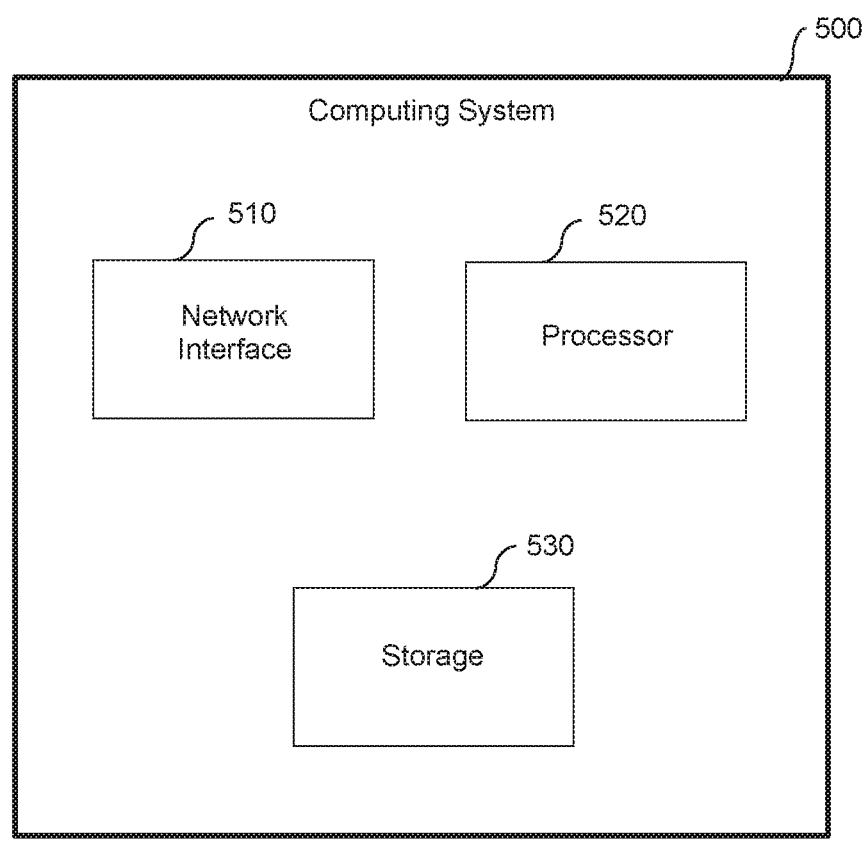
FIG. 5 is a diagram illustrating a computing system for managing a conferred asset blockchain exchange, according to example embodiments.

FIG. 5 illustrates a computing system 500 for managing a conferred asset blockchain exchange, according to example embodiments. The computing system 500 may include one or more of the broker agent and the intermediary blockchain included in the blockchain systems 100 and 200 shown in FIGS. 1 and 2. As a non-limiting example, the computing system 500 may be a server, a cloud platform, a workstation, an instance of one of thereof, and the like. Referring to FIG. 5, the computing system 500 includes a network interface 510, a processor 520, and a storage 530. Although not shown in FIG. 5, the computing system may include other hardware components such as an input unit, a display, a transmitter, a receiver, and the like.

According to various embodiments, the processor 520 may execute broker agent software as described herein. Based on the broker agent software, the processor 520 may identify a first loyalty asset exchange request from a first user account and a second loyalty asset exchange request from a second user account which are capable of being used to settle each other. In some embodiments, the processor 520 may identify more than two loyalty asset exchange transactions that can be settled as a group, but for purposes of convenience, two exchange requests are described. The network interface 510 may transmit a request to an intermediary blockchain requesting the intermediary blockchain to perform a loyalty asset settlement transaction for the first and second loyalty asset exchange requests. In addition, the processor 520 may determine that first loyalty assets of the first user account and second loyalty assets of the second loyalty account have been transferred to temporary intermediary trading addresses, respectively, and release the first loyalty assets to the second user account and the second loyalty assets to the first user account, in response to the determining.

In some embodiments, the first loyalty assets of the first user account are stored on a first asset blockchain and the second loyalty assets of the second user account are stored on a second asset blockchain. In this example, the processor 520 may determine that the first loyalty assets are transferred to a temporary intermediary trading address of the first asset blockchain, and determine that the second loyalty assets are transferred to a temporary trading address of the second asset blockchain. Here, the temporary intermediary trading addresses are controlled by the broker agent computing system and are not controlled by user accounts.

According to various aspects, each loyalty asset exchange request may include one or more of a requested asset type and a requested amount of the asset type, proof of ownership of another asset that the owner wants to exchange for the requested asset type, and an address to receive the requested asset type. Here, the address may be an address included in an asset blockchain of the loyalty asset the user requests to receive. In some embodiments, the processor 520 may monitor a loyalty asset exchange request ledger of the intermediary blockchain to identify at least two loyalty asset exchange requests which can be settled together as a group. Furthermore, the processor 520 may control the intermediary blockchain to release the first and second loyalty assets to the second and first user accounts, respectively, in response to detecting that the user accounts have relinquished control of the assets to be exchanged.

Figure 6:
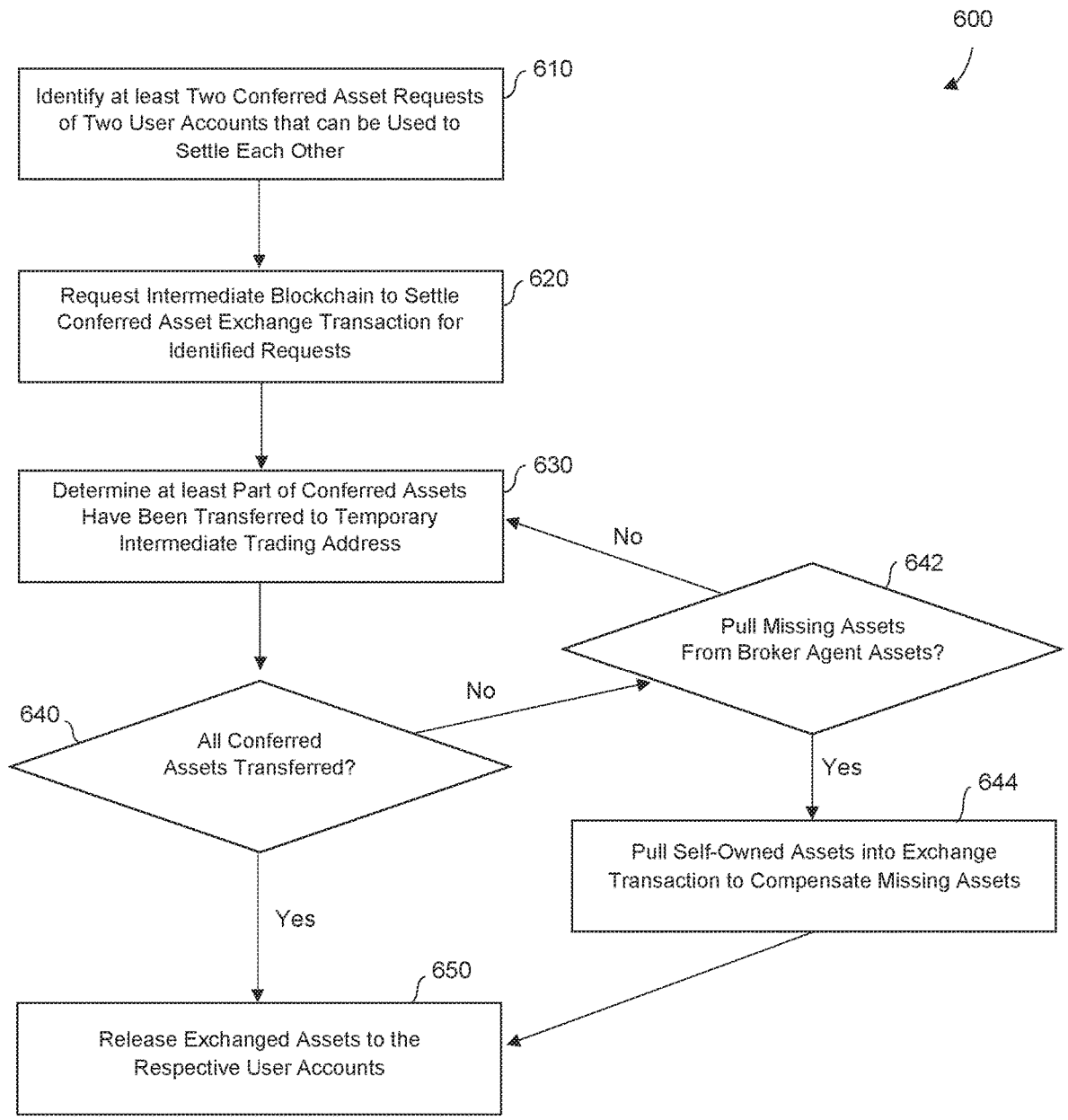
FIG. 6 is a diagram illustrating a broker agent pulling assets from a broker account to settle an exchange transaction between at least two user accounts, according to example embodiments.

FIG. 6 illustrates a process 600 of a broker agent pulling conferred assets from a broker account to settle an exchange transaction between at least two user accounts, according to example embodiments. For example, the process 600 may be performed by the broker agent 230 shown in FIG. 2, or another computing device, software, or a combination thereof. Referring to FIG. 6, in 610 a broker agent identifies at least two conferred asset exchange requests that can be used to settle each other. For example, the conferred assets may be assets conferred to a user account via an entity such as a merchant, a financial institution, or the like. In 620, the broker agent may request an intermediary exchange blockchain to perform a conferred asset settlement transaction for the at least two conferred asset transaction requests identified in 610. Furthermore, in 630, the broker agent determines that at least one of the user accounts has transferred conferred assets to a temporary intermediate trading address controlled by the broker agent.

According to various embodiments, the broker agent may involve their own loyalty assets to satisfy the exchange requests of a loyalty asset exchange if one or more user accounts have not fully satisfied conditions of the exchange. In this case, one or more of the users may not provide enough loyalty assets previously promised to satisfy the other user included in the exchange. In this case, the broker agent may add or otherwise pull some of its own (i.e., self-owned) loyalty assets to the exchange. Accordingly, the broker agent may invoke their own loyalty assets into the exchange and reimburse themselves in the case the user account fully satisfies their initial obligation or risk losing their own loyalty assets if the user account does not satisfy their obligation.

For example, in 640, the broker agent may determine whether enough conferred assets have been transferred to temporary intermediate trading addresses to settle all user account requests included in the exchange settlement transaction. If enough assets have been exchanged, in 650 the broker agent releases the loyalty assets to the new owners. However, if enough assets have not been exchanged, in 642 the broker agent may determine whether to pull its own conferred assets into the transaction to settle one or more user account exchange requests. For example, the decision on whether to pull its own assets into the transaction may be based on a prediction of the likelihood or risk of the loyalty assets eventually being provided by the defaulting user account. If the broker agent determines to pull its own loyalty assets, in 644 the broker pulls the conferred assets to compensate for the missing assets, and in 650 the assets are released to the user accounts. However, if the broker agent determines not to pull its own assets in 642, the process returns to step 630.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

What is claimed is:

1. A method, comprising:
identifying a first blockchain request of a first user on a first blockchain and a second blockchain request of a second user on a second blockchain which are capable of satisfying each other;
transmitting an identifier of a temporary address controlled by a software agent on the first blockchain to the first user and an identifier of a temporary address controlled by the software agent on the second blockchain to the second user;
monitoring, via the software agent, the temporary address on the first blockchain and the temporary address on the second blockchain;
determining, via the software agent, that a data value requested by the second blockchain request has been stored at the monitored temporary address on the first blockchain and a data value requested by the first blockchain request has been stored at the monitored temporary address on the second blockchain; and
releasing, via the software agent, the data value stored at the monitored temporary address on the first blockchain to an address of the second user on the first blockchain and the data value stored at the monitored temporary address on the second blockchain to an address of the first user on the second blockchain.

2. The method of claim 1, wherein the identifying further comprises identifying at least one additional blockchain request from at least one additional user which is capable of being satisfied together with a group including the first blockchain request and the second blockchain request, and requesting an intermediary blockchain to process the first, second, and at least one additional blockchain requests.

3. The method of claim 1, wherein the first blockchain request identifies first assets stored on a first asset blockchain and the second blockchain request identifies second assets stored on a second asset blockchain.

4. The method of claim 3, wherein the determining comprises determining that the first assets are stored at a temporary address controlled by the software agent on the first asset blockchain, and determining that the second assets are stored at a temporary address controlled by the software agent on the second asset blockchain.

5. The method of claim 1, wherein each of the first and second blockchain requests include: a requested asset type and a requested amount of the requested asset type, proof of ownership of another asset being exchanged for the requested asset type, and an address to receive the requested asset type.

6. The method of claim 1, wherein the identifying comprises monitoring, by the software agent, a blockchain ledger of an intermediary blockchain to identify the first and second blockchain requests which can satisfy each other.

7. The method of claim 1, wherein the releasing comprises controlling, via the software agent, release of the data value requested by the first blockchain request to a digital wallet of the first user on the second blockchain, and release of the data value requested by the second blockchain request to a digital wallet of the second user on the first blockchain.

8. A system, comprising:
a processor configured to identify a first blockchain request of a first user on a first blockchain and a second blockchain request of a second user on a second blockchain which are capable of satisfying each other; and
a transmitter configured to transmit an identifier of a temporary address controlled by a software agent on the first blockchain to the first user and an identifier of a temporary address controlled by the software agent on the second blockchain to the second user;
wherein the processor is further configured to
monitor, via the software agent, the temporary address on the first blockchain and the temporary address on the second blockchain;
determine, via the software agent, that a data value requested by the second blockchain request has been stored at the monitored temporary address on the first blockchain and a data value requested by the first blockchain request has been stored at the monitored temporary address on the second blockchain; and
release, via the software agent, the data value stored at the monitored temporary address on the first blockchain to an address of the second user on the first blockchain and the data value stored at the monitored temporary address on the second blockchain to an address of to the first user on the second blockchain.

9. The system of claim 8, wherein the processor is further configured to identify at least one additional blockchain request from at least one additional user which is capable of being satisfied together with a group including the first blockchain request and the second blockchain request, and control the transmitter to request an intermediary blockchain to process the first, second, and at least one additional blockchain requests.

10. The system of claim 8, wherein the first blockchain request identifies first assets stored on a first asset blockchain and the second blockchain request identifies second assets stored on a second asset blockchain.

11. The system of claim 10, wherein the processor is configured to determine that the first assets are stored at a temporary address controlled by the software agent on the first asset blockchain, and determine that the second assets are stored at a temporary address controlled by the software agent on the second asset blockchain.

12. The system of claim 8, wherein each of the first and second blockchain requests include: a requested asset type and a requested amount of the requested asset type, proof of ownership of another asset being exchanged for the requested asset type, and an address to receive the requested asset type.

13. The system of claim 8, wherein the processor is configured to monitor, via the software agent, a blockchain ledger of an intermediary blockchain to identify the first and second blockchain requests which can satisfy each other.

14. The system of claim 8, wherein the processor is configured to control, via the software agent, release of the data value requested by the first blockchain request to a digital wallet of the first user on the second blockchain, and release of the data value requested by the second blockchain request to a digital wallet of the first user on the second blockchain.

15. A non-transitory computer readable storage medium configured to store instruction that when executed cause a processor to perform:
identifying a first blockchain request of a first user on a first blockchain and a second blockchain request of a second user on a second blockchain which are capable of satisfying each other;
transmitting an identifier of a temporary address controlled by a software agent on the first blockchain to the first user and an identifier of a temporary address controlled by the software agent on the second blockchain to the second user;
monitoring, via the software agent, the temporary address on the first blockchain and the temporary address on the second blockchain;
determining, via the software agent, that a data value requested by the second blockchain request has been stored at the monitored temporary address on the first blockchain and a data value requested by the first blockchain request has been stored at the monitored temporary address on the second blockchain; and
releasing, via the software agent, the data value stored at the monitored temporary address on the first blockchain to an address of the second user on the first blockchain and the data value stored at the monitored temporary address on the second blockchain to an address of the first user on the second blockchain.

16. The non-transitory computer readable medium of claim 15, wherein the first blockchain request identifies first assets stored on a first asset blockchain and the second blockchain request identifies second assets stored on a second asset blockchain.

17. The non-transitory computer readable medium of claim 16, wherein the determining comprises determining that the first assets are stored at a temporary address controlled by the software agent on the first asset blockchain, and determining that the second assets are stored at a temporary address controlled by the software agent on the second asset blockchain.

* * * * *